(12) United States Patent
Sampath et al.

(10) Patent No.: US 12,437,156 B2
(45) Date of Patent: Oct. 7, 2025

(54) TRANSCRIPTION SYSTEMS AND METHODS FOR CHALLENGING CLEARANCES

(71) Applicant: HONEYWELL INTERNATIONAL INC., Charlotte, NC (US)

(72) Inventors: Mahesh Kumar Sampath, Madurai (IN); Vasantha Selvi Paulraj, Madurai (IN); Gobinathan Baladhandapani, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 235 days.

(21) Appl. No.: 18/153,075

(22) Filed: Jan. 11, 2023

(65) Prior Publication Data

US 2024/0143937 A1 May 2, 2024

(30) Foreign Application Priority Data

Oct. 28, 2022 (IN) .............................. 202211061533

(51) Int. Cl.
*G10L 15/22* (2006.01)
*B64D 45/00* (2006.01)
(Continued)

(52) U.S. Cl.
CPC .............. *G06F 40/35* (2020.01); *B64D 45/00* (2013.01); *G06F 3/0481* (2013.01);
(Continued)

(58) Field of Classification Search
CPC ......... G10L 15/22; G10L 15/26; G06F 40/35; B64D 45/00
See application file for complete search history.

(56) References Cited

U.S. PATENT DOCUMENTS 6,992,626 B2 1/2006 Smith
7,184,863 B2 2/2007 Weineck
(Continued)

FOREIGN PATENT DOCUMENTS

CN 110335609 A 10/2019
CN 111785257 A 10/2020
(Continued)

OTHER PUBLICATIONS

Cardosi, Kim and Tracy Lennertz."Loss of Controller-Pilot Voice Communications in Domestic En Route Airspace." DOT-VNTSC-FAA-17-04, dated Feb. 2016.
(Continued)

*Primary Examiner* — Daniel Abebe
(74) *Attorney, Agent, or Firm* — Ingrassia Fisher & Lorenz, LLP (57) ABSTRACT

Methods and systems are provided for assisting operation of a vehicle using speech recognition and transcription to provide a conversation log graphical user interface (GUI) display. One method involves analyzing a transcription of an audio communication to identify a discrepancy with respect to an expected response to the communication by an operator of the vehicle, generating, on the conversation log GUI display, a selectable GUI element associated with the discrepancy in association with the graphical representation of the transcription of the audio communication, and in response to user selection of the selectable GUI element, providing, on the conversation log GUI display, a graphical representation of information relating to the discrepancy to facilitate challenging the veracity of the transcribed audio communication.

20 Claims, 5 Drawing Sheets

(51) Int. Cl.
  *G06F 3/0481* (2022.01)
  *G06F 3/0484* (2022.01)
  *G06F 3/16* (2006.01)
  *G06F 40/20* (2020.01)
  *G06F 40/35* (2020.01)
  *G10L 15/18* (2013.01)
  *G08G 5/26* (2025.01)

(52) U.S. Cl.
  CPC ............ *G06F 3/0484* (2013.01); *G06F 3/167* (2013.01); *G06F 40/20* (2020.01); *G10L 15/1815* (2013.01); *G10L 15/22* (2013.01); *G08G 5/26* (2025.01)

(56) References Cited

U.S. PATENT DOCUMENTS

| | | |
|---|---|---|
| 7,415,326 B2 | 8/2008 | Komer et al. |
| 7,668,719 B2 | 2/2010 | Nakagawa et al. |
| 7,733,903 B2 | 6/2010 | Bhogal et al. |
| 7,809,405 B1 | 10/2010 | Rand et al. |
| 7,881,832 B2 | 2/2011 | Komer et al. |
| 8,149,141 B2 | 4/2012 | Coulmeau et al. |
| 8,180,503 B2 | 5/2012 | Estabrook et al. |
| 8,280,741 B2 | 10/2012 | Colin et al. |
| 8,340,839 B2 | 12/2012 | Yogesha et al. |
| 8,645,136 B2 * | 2/2014 | Milstein .................. G10L 15/01 704/244 |
| 8,681,040 B1 | 3/2014 | Rathinam et al. |
| 8,704,701 B2 | 4/2014 | Pschierer et al. |
| 8,768,698 B2 | 7/2014 | Mengibar et al. |
| 8,793,139 B1 | 7/2014 | Serban et al. |
| 8,812,316 B1 | 8/2014 | Chen |
| 8,909,392 B1 | 12/2014 | Carrico |
| 8,957,790 B2 | 2/2015 | Cornell et al. |
| 9,047,870 B2 | 6/2015 | Ballinger et al. |
| 9,190,073 B2 | 11/2015 | Dong et al. |
| 9,443,433 B1 | 9/2016 | Conway et al. |
| 9,487,167 B2 | 11/2016 | Graumann et al. |
| 9,620,119 B2 | 4/2017 | Bilek et al. |
| 9,642,184 B2 | 5/2017 | Plocher et al. |
| 9,665,645 B2 | 5/2017 | Hawley |
| 9,666,178 B2 | 5/2017 | Loubiere et al. |
| 9,704,405 B2 | 7/2017 | Kashi et al. |
| 9,830,829 B1 | 11/2017 | Doyen et al. |
| 9,881,608 B2 | 1/2018 | Lebeau et al. |
| 10,056,085 B2 | 8/2018 | Klose et al. |
| 10,204,430 B2 | 2/2019 | Gowda |
| 10,490,085 B2 | 11/2019 | Cotdeloup et al. |
| 10,535,351 B2 | 1/2020 | Gaston et al. |
| 10,818,192 B2 | 10/2020 | Chen et al. |
| 2004/0124998 A1 | 7/2004 | Dame |
| 2004/0263381 A1 | 12/2004 | Mitchell et al. |
| 2005/0144187 A1 | 6/2005 | Che et al. |
| 2005/0203700 A1 | 9/2005 | Merritt |
| 2006/0229873 A1 | 10/2006 | Eide et al. |
| 2007/0189328 A1 | 8/2007 | Judd |
| 2007/0288128 A1 | 12/2007 | Komer et al. |
| 2008/0201148 A1 | 8/2008 | Desrochers |
| 2011/0028147 A1 | 2/2011 | Calderhead, Jr. et al. |
| 2011/0125503 A1 | 5/2011 | Dong et al. |
| 2011/0137653 A1 | 6/2011 | Ljolje et al. |
| 2011/0202351 A1 | 8/2011 | Plocher et al. |
| 2011/0231036 A1 | 9/2011 | Yogesha et al. |
| 2012/0078448 A1 | 3/2012 | Dorneich et al. |
| 2012/0239761 A1 | 9/2012 | Linner et al. |
| 2013/0093612 A1 | 4/2013 | Pschierer et al. |
| 2013/0103297 A1 | 4/2013 | Bilek et al. |
| 2014/0300495 A1 | 10/2014 | Scheu et al. |
| 2015/0081138 A1 | 3/2015 | Lacko et al. |
| 2015/0162001 A1 | 6/2015 | Kar et al. |
| 2015/0212671 A1 | 7/2015 | Judy et al. |
| 2015/0212701 A1 | 7/2015 | Rodney et al. |
| 2015/0312175 A1 * | 10/2015 | Langholz .................. G06F 3/16 715/752 |
| 2016/0036751 A1 | 2/2016 | Ban |
| 2016/0063999 A1 | 3/2016 | Gaston et al. |
| 2016/0125744 A1 | 5/2016 | Shamasundar et al. |
| 2016/0155435 A1 * | 6/2016 | Mohideen ............... G10L 15/01 704/235 |
| 2016/0360336 A1 | 12/2016 | Gross et al. |
| 2016/0379640 A1 | 12/2016 | Joshi et al. |
| 2017/0039858 A1 | 2/2017 | Wang et al. |
| 2018/0061243 A1 | 3/2018 | Shloosh |
| 2019/0147858 A1 | 5/2019 | Letsu-Dake et al. |
| 2019/0244528 A1 | 8/2019 | Srinivasan et al. |
| 2020/0251113 A1 * | 8/2020 | LeBeau .................. G10L 15/30 |
| 2020/0322040 A1 | 10/2020 | Middlestead et al. |
| 2020/0372916 A1 | 11/2020 | Delpech |
| 2021/0295840 A1 | 9/2021 | John et al. |
| 2022/0078071 A1 | 3/2022 | Agapitos et al. |
| 2022/0309928 A1 | 9/2022 | Chopra et al. |
| 2022/0343897 A1 | 10/2022 | Agarwal et al. |
| 2022/0406194 A1 | 12/2022 | Saptharishi et al. |

FOREIGN PATENT DOCUMENTS

| | | |
|---|---|---|
| DE | 102009025530 A1 | 12/2010 |
| EP | 0613110 A1 | 8/1994 |
| EP | 0618565 A2 | 10/1994 |
| EP | 1318492 A2 | 6/2003 |
| EP | 2026328 A1 | 2/2009 |
| EP | 3664065 A1 | 6/2020 |
| EP | 3889947 A1 | 10/2021 |
| FR | 3032574 A1 | 8/2016 |
| FR | 3032575 A1 | 8/2016 |
| FR | 3009759 B1 | 3/2017 |
| KR | 102003321 B1 | 7/2019 |
| WO | 2016076939 A1 | 5/2016 |

OTHER PUBLICATIONS

"Air-Ground Voice Communications," SKYbrary, downloaded from Internet Mar. 28, 2018.

"Loss of Communication," SKYbrary, downloaded from Internet Mar. 28, 2018.

Baladhandapani, G., et al. "Transcription System and Related Supplementation Methods," Filed on Jun. 24, 2022 and assigned U.S. Appl. No. 17/808,816.

* cited by examiner

TRANSCRIPTION SYSTEMS AND METHODS FOR CHALLENGING CLEARANCES

CROSS REFERENCE TO RELATED APPLICATION

This application claims priority to India Provisional Patent Application No. 202211061533, filed Oct. 28, 2022, the entire content of which is incorporated by reference herein.

TECHNICAL FIELD

The subject matter described herein relates generally to vehicle systems, and more particularly, embodiments of the subject matter relate to avionics systems and methods that facilitate challenging ambiguities or uncertainties in air traffic control clearance communications.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft, with a pilot or crewmember onboard that aircraft acknowledging the request (e.g., by reading back the received information) in a separate communication that also includes the call sign. As a result, the ATC can determine that the correct aircraft has acknowledged the request, that the request was correctly understood, what the pilot intends to do, etc. Larger airports typically have a large number of taxiways, runways, terminals and/or hangars, potentially resulting in more complex instructions, which in combination with an increasing amount of ground traffic (which also increases the likelihood of runway incursions), further increases the demand on pilots and ATC.

ATC typically relies on different sources of information, such as radar, paper or electronic flight progress strips, radio and interphone communications to comprehend the complex, dynamic, and time-constrained situations before issuing corresponding clearance instructions to avoid potential conflicts between aircraft and to ensure safety. Unfortunately, there are numerous factors that can complicate clearance communications, such as, for example, the volume of traffic in the airspace, similarities between call signs of different aircrafts in the airspace, noise, congestion or interference on the communications channel being utilized, and/or human fallibilities (e.g., inexperience, hearing difficulties, memory lapse, language barriers, distractions, fatigue, etc.). As a result, clearance instructions may be incomplete, ambiguous, unclear or otherwise lack adequate information for proper execution, where reliance on such clearance instructions can pose safety risks. For example, an incomplete and/or incorrect clearance communication could be acknowledged or acted on by a pilot, or a pilot of one aircraft may attempt to adhere to a clearance intended for another aircraft (e.g., as a result of call sign confusion). Accordingly, it is desirable to provide aircraft systems and methods that facilitate challenging ATC clearances or commands for improved clarity and safety. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition and transcription. One method involves obtaining a transcription of an audio communication with respect to the vehicle, generating a conversation log graphical user interface (GUI) display including a graphical representation of the transcription of the audio communication, analyzing the transcription of the audio communication to identify a discrepancy between the transcription of the audio communication and an expected response to the audio communication by an operator of the vehicle, generating, on the conversation log GUI display, a selectable GUI element associated with the discrepancy in association with the graphical representation of the transcription of the audio communication, and in response to user selection of the selectable GUI element, providing, on the conversation log GUI display, a graphical representation of information relating to the discrepancy.

In another embodiment, a computer-readable medium having computer-executable instructions stored thereon is provided. The computer-executable instructions, when executed by a processing system, cause the processing system to obtain a transcription of an audio communication with respect to a vehicle, generate a conversation log GUI display including a graphical representation of the transcription of the audio communication, analyze the transcription of the audio communication to identify a discrepancy between the transcription of the audio communication and an expected response to the audio communication by an operator of the vehicle, generate, on the conversation log GUI display, a selectable GUI element associated with the discrepancy in association with the graphical representation of the transcription of the audio communication, and in response to user selection of the selectable GUI element, providing, on the conversation log GUI display, a graphical representation of information relating to the discrepancy.

In another embodiment, a system is provided that includes a display device, a data storage element to maintain a transcription of an audio communication with respect to a vehicle, and a processing system coupled to the display device and the data storage element. The processing system is configurable to generate, on the display device, a conversation log GUI display including a graphical representation of the transcription of the audio communication, analyze the transcription of the audio communication to identify a discrepancy between the transcription of the audio communication and an expected response to the audio communication by an operator of the vehicle, generate, on the conversation log GUI display, a selectable GUI element associated with the discrepancy in association with the graphical representation of the transcription of the audio communication, and in response to user selection of the selectable GUI element, provide, on the conversation log GUI display, a graphical representation of information relating to the discrepancy.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods for supplementing or augmenting presentation of clearance communications and/or other audio communications associated with a vehicle with graphical indicia that facilitate a pilot, co-pilot or other crew member challenging the veracity of a transcribed clearance communication issued by an air traffic controller (ATC) that is incomplete, ambiguous, unclear, conflicting or otherwise anomalous, and thereby reduce or otherwise mitigate discrepancies between a received clearance communication and an expected clearance communication. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-5, audio communications received at the aircraft are transcribed and the corresponding textual representation of the transcribed audio communications is graphically presented on a conversation log graphical user interface (GUI) display that includes graphical representations of the transcribed audio communications arranged in a sequential manner in accordance with the timestamps associated with the respective audio communications. The transcribed audio communications are also parsed and analyzed to automatically identify an operational subject of a respective audio communication with respect to the aircraft. For example, natural language processing (NLP), parts of speech tagging, semantic analysis and/or artificial intelligence (AI) techniques may be applied to the transcribed audio communications to ascertain the intent of a respective audio communication and identify the operational subjects or entities to which the respective audio communication pertains, such as, a particular aircraft or flight identifier, a runway, a taxiway, a waypoint, a heading, an altitude, a flight level, a communications radio or another avionics system or setting, an aircraft action (e.g., landing, takeoff, pushback, hold, or the like) and/or the like. In one or more implementations, an expected clearance communication for the aircraft may be determined based on the operational objective and applicable phraseology standards, such as the international standards of phraseology set forth in the International Civil Aviation Organization (ICAO) Annex 10 Volume II Chapter 5, ICAO Doc 4444 Chapter 12 and in ICAO Doc 9432—Manual of Radiotelephony or another applicable phraseology standard for the particular geographic region or airspace (e.g., modified ICAO standards for improved suitability with a particular locality). In this regard, the expected clearance communication reflects the standard phraseology to be used for an audio clearance communication intending or attempting to achieve the identified operational objective.

In exemplary embodiments described herein, the operational objective of the received clearance communication is utilized to identify or otherwise determine an expected response to the received clearance communication by a pilot or other vehicle operator. In this regard, the expected response includes one or more actions by the pilot or vehicle operator with respect to an onboard system, for example, by inputting or otherwise providing values for one or more parameters or variables to configure or otherwise program the onboard system (or a functionality or feature associated therewith) to support executing the received clearance communication. Based on the expected pilot response, one or more parameters or variables expected to be included in the received clearance communication are determined or otherwise identified and then utilized to analyze the content of the received clearance communication to verify the received clearance communication specifies or otherwise includes a value for those parameters or variables associated with the expected pilot response. In this regard, a potential discrepancy associated with the received clearance communication is automatically detected or otherwise identified when the received clearance communication fails to include or specify a value for a parameter or variable associated with the expected pilot response.

In response to identifying a discrepancy associated with a received clearance communication, embodiments described herein automatically classify or otherwise categorize the discrepancy as one of a number of different potential classifications based on the current operational context. In this regard, based on the parameter or variable for the expected pilot response that is absent or missing from the received clearance communication, the current aircraft status information (e.g., location, heading, altitude, flight plan, flight phase, procedure, configuration and/or the like) and preceding communications associated with the aircraft are analyzed to determine whether the received clearance communication is incomplete (e.g., a value for the parameter or variable is missing and cannot be inferred from the current aircraft status or preceding communications), ambiguous (e.g., a value for the parameter or variable is missing and multiple different values for the parameter or variable can be inferred from the current aircraft status or preceding communications), unclear (e.g., an inferred value or transcribed value for the parameter or variable appears to be incorrect due to radio interference, poor signal reception, inadequate volume, etc.), represents an operational conflict (e.g., an inferred value for the parameter or variable conflicts with one or more of the current aircraft status, flight plan, procedure, airport, etc.) or exhibits some other anomalous condition. A graphical indication of the classification assigned to the received clearance communication is generated or otherwise provided on the conversation log GUI display in association with the graphical representation of the transcription of the received clearance communication to notify and convey the nature of the discrepancy associated with the clearance communication to the pilot or other user analyzing the conversation log GUI display.

In addition to providing graphical indicia of the assigned classification or type of discrepancy or anomaly associated with a received clearance communications, in exemplary embodiments, a button or other selectable GUI element is rendered or otherwise generated on the conversation log GUI display in association with the graphical representation of the respective clearance communication to enable the pilot or other user to view one or more suggestions or other information relating to the discrepancy to facilitate challenging the ATC to resolve the discrepancy associated with the received clearance communication. For example, in one or more embodiments, selection of the GUI element initiates presentation of an advisory window or other region on the conversation log GUI display that is populated with suggested resolutions or other information that the pilot can use to respond to the ATC to request clarification of the received clearance communication. In exemplary implementations, the current operational context or other information associated with the operation of the aircraft is utilized to automatically determine suggested resolutions for populating the advisory region of the conversation log GUI display. For example, based on one or more preceding clearance communications, the current location and/or heading of the aircraft, and/or the like, an expected value (or a set of potential values) for the missing parameter or variable of interest may be identified or otherwise determined and provided to the pilot or other user for consideration when challenging the veracity of the ATC clearance communication. In this regard, the pilot may utilize the suggested resolutions to communicate with the ATC to resolve any discrepancies and clarify the clearance prior to execution.

Figure 1:
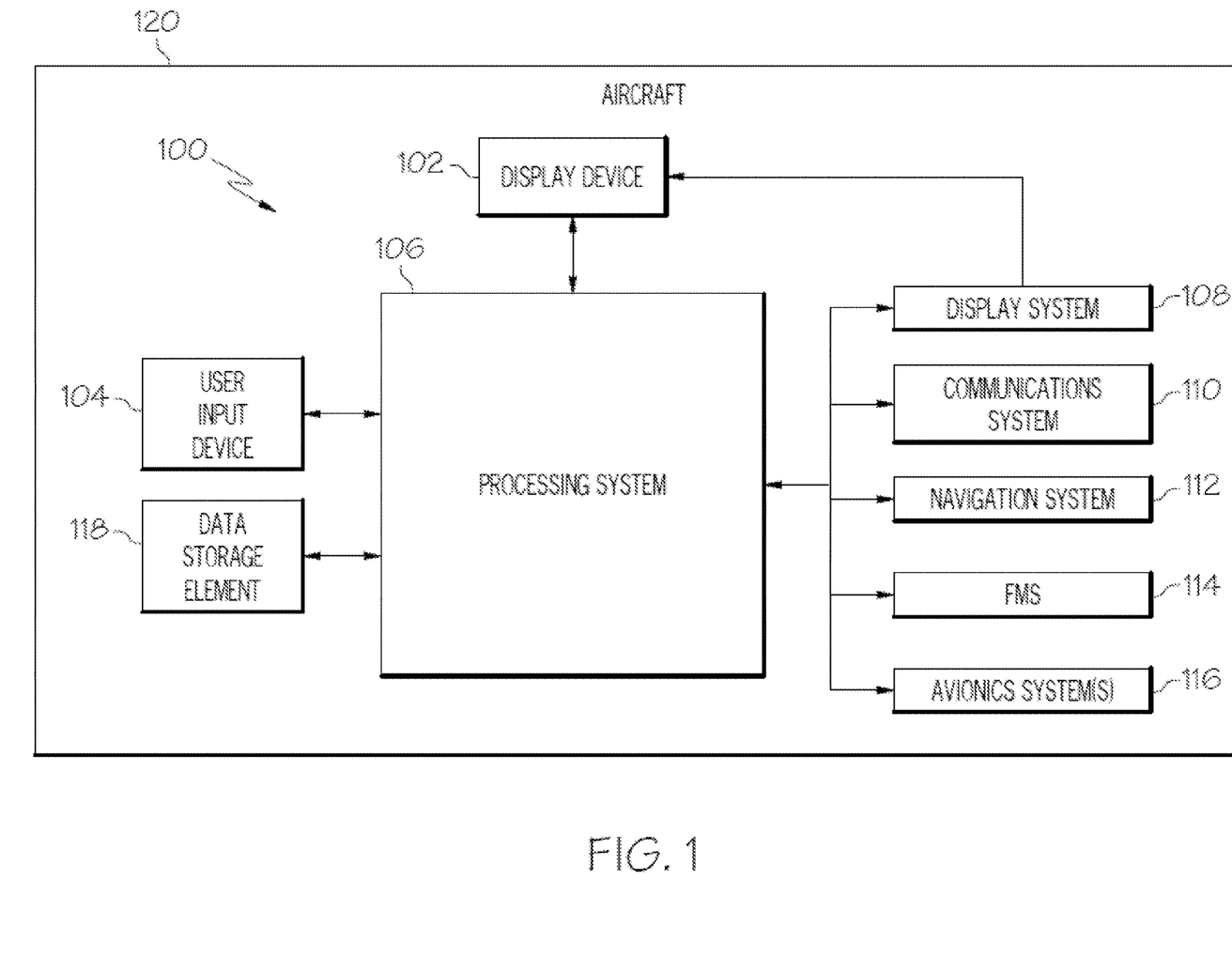
FIG. 1 is a block diagram illustrating a system suitable for use with a vehicle such as an aircraft in accordance with one or more exemplary embodiments.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, an airport database, a terminal airspace database, a special use airspace database, or other information for rendering and/or displaying navigational maps and/or other content on the display device 102.

In the illustrated embodiment, the aircraft system 100 includes a data storage element 118, which is capable of storing, maintaining or otherwise implementing one or more of the databases that support operations of the aircraft system 100 described herein. In some embodiments, the data storage element 118 contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information includes instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
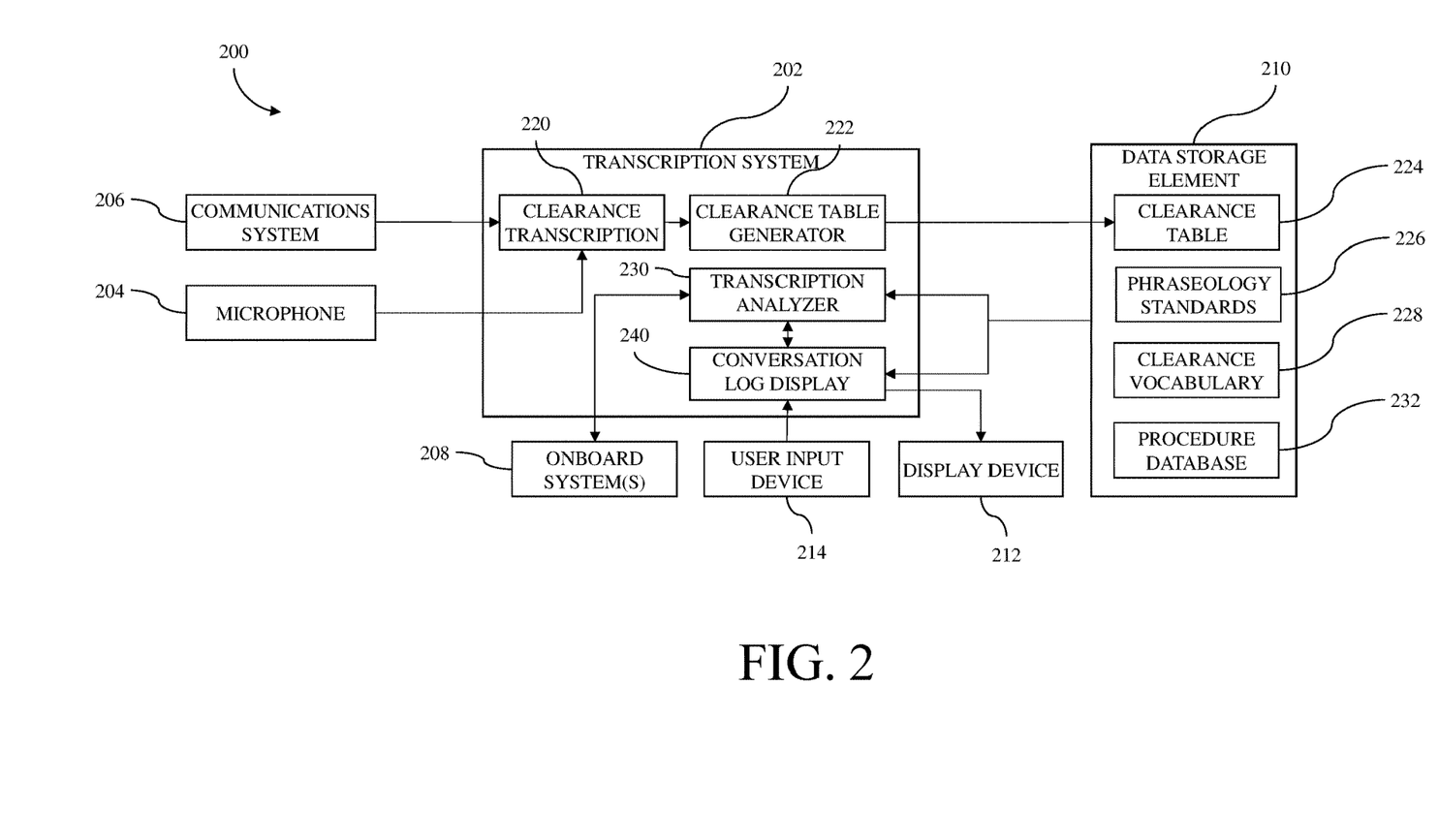
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., audio broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at an EFB distinct from the aircraft or at a ground location such as an air traffic control facility. That said, for purposes of explanation, the speech recognition system 200 may be primarily described herein in the context of an implementation onboard an aircraft.

The illustrated speech recognition system 200 includes a transcription system 202, an audio input device 204 (or microphone) and one or more communications systems 206 (e.g., communications system 110). The transcription system 202 may also be coupled to one or more onboard systems 208 (e.g., one or more avionics systems 108, 110, 112, 114, 116) to receive data messages for concurrent presentation with transcribed audio communications on a common GUI display on a display device 212 (e.g., display device 102). It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content (or audio signals) into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing (NLP), parts of speech tagging, artificial intelligence (AI) or other suitable techniques and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a transcription analysis application 230 (or transcription analyzer) capable of analyzing, parsing, or otherwise processing transcriptions of received audio communications along with their associated fields of data maintained in the clearance table 224 to detect or otherwise identify when a potential discrepancy or other anomaly exists with respect to the transcription of an audio communication. As described in greater detail below in the context of FIG. 3, the transcription analyzer 230 may utilize applicable phraseology standard(s) 226 in concert with a clearance vocabulary 228 to perform semantical and syntactical analysis (e.g., NLP, AI, parts of speech tagging, and/or the like) on a respective transcription of a clearance communication to automatically identify or otherwise determine an expected response by the pilot to the clearance communication based on the operational objective and/or content of the clearance communication and automatically identify potential discrepancies between a transcribed clearance communication and the expected pilot response. In this regard, the phraseology standards information 226 may include reference phraseologies, verbiage, syntactical rules and/or other syntactical information that define or otherwise delineate the applicable phraseology standard(s) for the aircraft at the current geographic location of the aircraft, which may be set forth by the ICAO, the FAA, or another regulatory body or organization, while the clearance vocabulary 228 includes the potential words, alphanumeric values, terms and/or phrases that are likely to be utilized in the context of ATC clearance communications. In this manner, the transcription analyzer 230 analyzes a transcription of a received audio clearance communication to detect or otherwise identify when a respective clearance communication utilizes nonstandard (or noncompliant) phraseology and/or indirect or incomplete information, for example, by failing to explicitly or directly specify values for one or more parameters or variables expected to be utilized by a pilot when initiating or otherwise performing the expected response to the clearance communication.

In exemplary embodiments, the transcription analyzer 230 utilizes information indicative of the current operational context (e.g., the current aircraft location, the current aircraft heading, the current aircraft altitude, the current aircraft flight phase, the current flight plan, current air traffic, and/or the like) obtained from one or more onboard systems 208, one or more preceding clearance communications maintained in the clearance table 224, and/or procedure information maintained in a procedure database 232 to automatically classify, categorizer or otherwise assign a particular classification or type to the detected discrepancy given the current operational context. Additionally, in exemplary implementations, the transcription analyzer 230 utilizes the current operational context to automatically determine or otherwise identify one or more potential suggestions for resolving the detected discrepancy in a manner that accounts for or otherwise reflects the current operational context.

Still referring to FIG. 2, in one or more embodiments, the processor, control module, or other hardware associated with the transcription system 202 executes computer-executable programming instructions that cause the transcription system 202 to generate, execute, or otherwise implement a conversation log display application 240 capable of generating or otherwise providing a conversation log GUI display that includes graphical representations of the transcribed audio communications from the clearance table 224 in a sequential, time-ordered manner. In some implementations, the conversation log GUI display may also be interspersed with graphical representations of data messages, text messages and/or other messages received via one or more onboard system(s) 208.

In various embodiments, the transcription analyzer 230 may automatically generate, transmit, or otherwise provide output signals indicative of a detected discrepancy, the corresponding classification assigned to the discrepancy, and the potential suggestions for resolving the discrepancy to a conversation log display application 240. When a potential discrepancy associated with a clearance communication is identified or otherwise detected, the transcription analyzer 230 provides a corresponding indication to the conversation log display application 240 which is cooperatively configured with the transcription analyzer 230 to generate or otherwise provide, on or within the conversation log GUI display, one or more graphical indicia of the assigned classification or type of discrepancy or anomaly associated with a received clearance communication. Additionally, in exemplary implementations, the conversation log display application 240 provides a selectable GUI element associated with the detected discrepancy that is associated with the suggested resolutions or other explanatory information relating to the detected discrepancy for the respective communication on the conversation log GUI display in spatial, visual or graphical association with the graphical representation of the respective communication. For example, the conversation log display application 240 may generate a button associated with presentation of explanatory information associated with a received ATC clearance communication adjacent to the graphical representation of the transcription of the received ATC clearance communication.

As described in greater detail below, in one or more exemplary embodiments, in response to user selection of the explanatory information GUI element, the conversation log display application 240 and the transcription analyzer 230 are cooperatively configured to generate an advisory region on the display device 212 that includes graphical representations of the suggested resolutions or other explanatory information related to the discrepancy associated with the respective communication. In this manner, the pilot or other user reviewing past communications on the conversation log GUI display may quickly and easily toggle the state of the conversation log GUI display on the display device 212 to depict an advisory region or window and review explanatory information relating to the discrepancy associated with a preceding communication of interest to the pilot. In this regard, in some embodiments, the advisory region may be displayed as a separate window or GUI display on, overlying or in lieu of the conversation log GUI display on the display device 212. That said, in other embodiments, the advisory region may be displayed as an inset within the conversation log GUI display or otherwise be incorporated into the conversation log GUI display such that selection of the supplemental information GUI element results in the conversation log GUI display dynamically updating to include the explanatory information within the display area occupied by the conversation log GUI display, for example, by inserting the suggested resolutions or other explanatory information on the conversation log GUI display at the corresponding position within the depicted sequence of clearance communications. A pilot or other user reviewing the conversation log GUI display may utilize the indicia of the detected type of discrepancy and corresponding suggested resolutions or other explanatory information to respond to the ATC or otherwise initiate communications with the ATC to challenge the veracity of a preceding clearance communication and resolve any potential discrepancies prior to performance of the expected pilot response(s) to execute the clearance communication.

Figure 3:
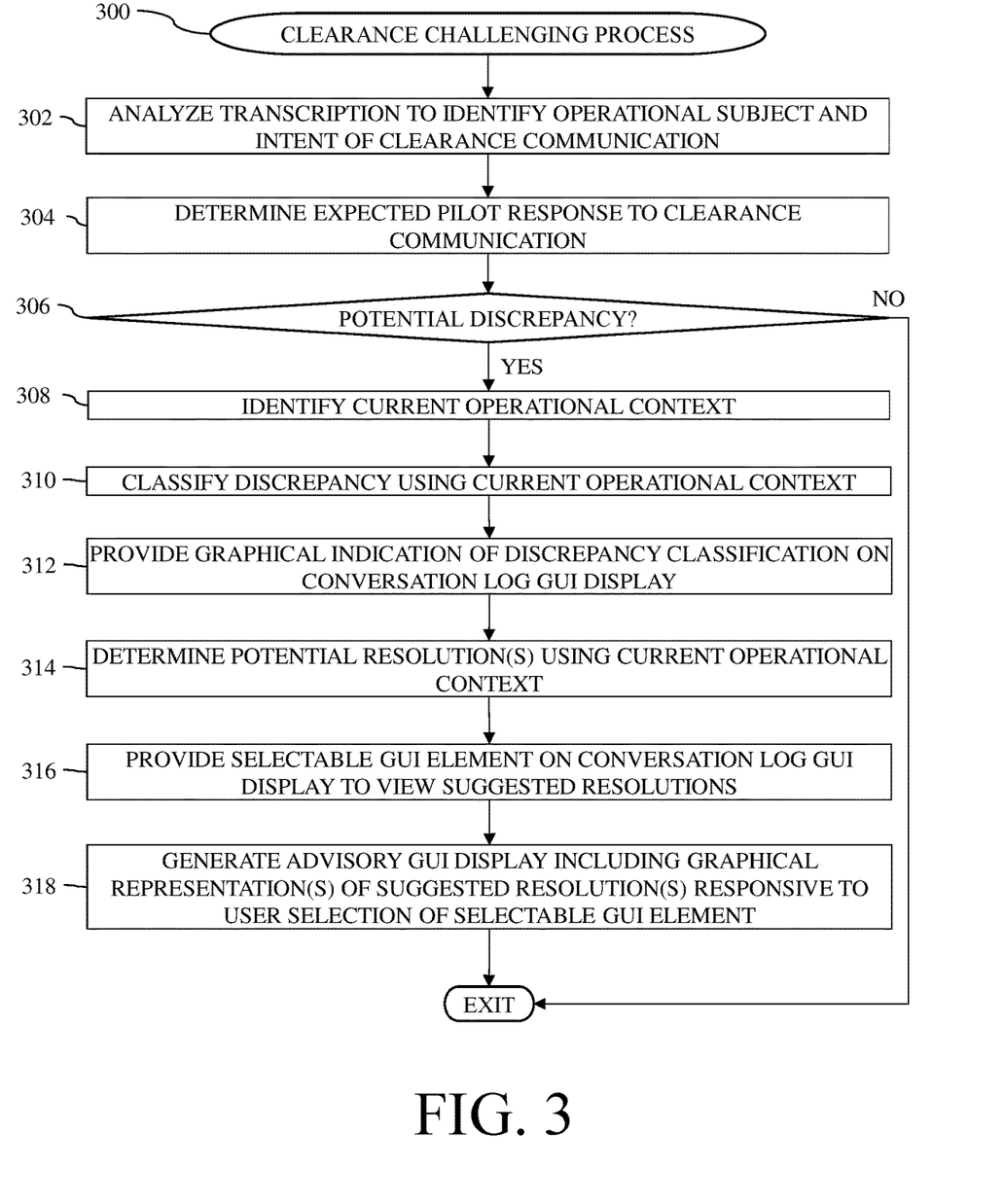
FIG. 3 is a flow diagram of a clearance challenging process suitable for implementation by the speech recognition system of FIG. 2 in the aircraft system of FIG. 1 in one or more exemplary embodiments.

FIG. 3 depicts an exemplary embodiment of a clearance challenging process 300 suitable for implementation by an aircraft system to provide graphical indicia that notify a pilot or other user of potential discrepancies associated with clearance communications and enable the pilot or other user to challenge ATC to resolve any discrepancies. The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the clearance challenging process 300 may be performed by different elements of the aircraft system 100. That said, exemplary embodiments are described herein in the context of the clearance challenging process 300 being primarily performed by the transcription analyzer 230 and/or the conversation log display application 240 at the transcription system 202 and/or the processing system 106. It should be appreciated that the clearance challenging process 300 may include any number of additional or alternative tasks, the tasks need not be performed in the illustrated order and/or the tasks may be performed concurrently, and/or the clearance challenging process 300 may be incorporated into a more comprehensive procedure or process having additional functionality not described in detail herein. Moreover, one or more of the tasks shown and described in the context of FIG. 3 could be omitted from a practical embodiment of the clearance challenging process 300 as long as the intended overall functionality remains intact.

Referring to FIG. 3 with continued reference to FIGS. 1-2, in exemplary embodiments, the clearance challenging process 300 is performed in connection with presentation of a conversation log GUI display on a display device 102, 212 that includes graphical representations of transcribed ATC clearance communications and/or other received audio communications that are sequentially arranged in a chronological or time-ordered manner. For example, the conversation log GUI display may be configurable to depict graphical representations of the transcribed audio communications corresponding to entries in the clearance table 224 where the ownship aircraft was the sender or intended recipient of the audio communications in a manner that allows a pilot or other user to scroll through the transcribed communications to review individual communications chronologically in the context of the ongoing conversation. In this regard, the conversation log GUI display may depict only a limited subset of the most recent communications based on the available display area allocated to a presentation region of the conversation log GUI display in concert with a scroll bar, slider or similar GUI element that allows the user to view older communications within the presentation region of the conversation log GUI display. In some implementations, other messages received outside of the audio communications (e.g., data messages) may be integrated into the conversation log GUI display in a chronological manner that reflects the temporal context of the messages with respect to the conversation context, thereby providing a more coherent and comprehensive understanding of the various communications received at or by various different systems onboard the aircraft. Thus, a pilot or other user is alleviated of the mental burden of synthesizing and chronologizing the communications.

In exemplary embodiments, the clearance challenging process 300 analyzes the text of transcribed audio communications to identify or otherwise determine the operational subject and intent of the communication (task 302). For example, as described above, the transcription system 202 (e.g., the clearance table generator 222 and/or the transcription analyzer 230) utilizes parts of speech tagging, semantic analysis, NLP and/or AI techniques to parse the textual representation of the content of a communication to determine the operational subject of the communication and/or the operational objective or intent of the communication (from which the operational subject can be derived or determined). In this regard, in some embodiments, the phraseology standards 226, the clearance vocabulary 228 and/or the procedure information maintained in the procedure database 232 may be utilized in concert with the transcription analysis to map the content of the received clearance communication to a particular standard command or instruction, a particular aircraft procedure (or an aspect thereof), and/or the like. In some embodiments, the transcription system 202 may also identify or otherwise obtain current status information indicative of the current, real-time operational context associated with the aircraft from one or more onboard systems 208 (e.g., the current flight phase, the current aircraft configuration, the current aircraft altitude, the current heading, the current speed and/or the like) and utilize the current operational context in connection with the analysis of the transcription to identify the operational subject that is consistent with the current operational context. For example, the transcription system 202 may identify the particular airport, runway, taxiway, waypoint, avionics system or setting, aircraft procedure, aircraft action (e.g., landing, takeoff, pushback, hold, or the like), parameter (e.g., heading, altitude, flight level, etc.) or other feature of interest (e.g., air traffic, terrain, obstacles, airspaces, etc.) related to operation of the aircraft 120 that is the subject of the respective communication.

After identifying the operational subject and intent of a particular communication, the clearance challenging process 300 identifies or otherwise determines an expected response by a vehicle operator to the communication (task 304). In this regard, the clearance challenging process 300 utilizes the intent and operational subject of a received clearance communication from ATC to determine how a pilot or other aircraft operator is expected to respond to the clearance communication. For example, in one or more embodiments, the clearance challenging process 300 identifies or otherwise determines which onboard systems 108, 110, 112, 114, 116, 208 the pilot is expected to interact with in response to the ATC clearance communication given its operational subject and what information the interaction is expected to involve given the intent or operational objective of the ATC clearance communication. It should be noted that the expected responsive pilot actions may be determined in any number of ways, including, but not limited to rule-based logic derived from standard operating procedures or other regulatory requirements or machine learning or artificial intelligence (AI) techniques or modeling based on previously observed pilot responses to preceding ATC clearance communications, and the subject matter described herein is not limited to any particular manner or technique for identifying or deriving an expected pilot response.

After determining the expected response to the received communication, the clearance challenging process 300 reanalyzes the content of the transcribed communication to detect or otherwise identify whether there is any potential discrepancies between the content of the transcribed communication and the expected response to the clearance communication (task 306). In this regard, the clearance challenging process 300 utilizes the expected pilot response to a received ATC clearance communication to identify or otherwise determine what parameters or variables the pilot is expected to utilize in responding to the received ATC clearance communication. For example, when the expected pilot response involves the pilot programming or configuring an onboard system 108, 110, 112, 114, 116, 208 to implement or otherwise perform a potential action corresponding to the operational objective with respect to the operational subject of the ATC clearance communication, the transcription analyzer 230 may analyze the transcription of the ATC clearance communication to determine whether or not the content of the includes a specified value for the particular parameter or variable to be utilized by the pilot to program or configure the onboard system 108, 110, 112, 114, 116, 208. When a specified value for the parameter or variable associated with the expected pilot response is absent or missing from the transcribed ATC clearance communication, the clearance challenging process 300 determines a potential discrepancy exists between the transcribed ATC clearance communication and the expected pilot response.

In response to detecting a potential discrepancy between the transcribed audio communication and the expected operator response, the clearance challenging process 300 continues by identifying or otherwise obtaining information indicative of the current operational context and then utilizes the current operational context to classify or otherwise assign the discrepancy as a particular type or classification of discrepancy (tasks 308, 310). In this regard, the transcription analyzer 230 obtains current status information associated with the aircraft from one or more onboard systems 208 and utilizes the current operational context (e.g., the current flight phase, the current airspace or geographic region of operation, the current aircraft configuration, the current aircraft altitude, and/or the like) to identify potential or plausible values for the missing operational parameter or variable based on the current operating state of the aircraft. For example, based on the current location, altitude, flight phase, flight plan, configuration and/or the like associated with the aircraft, the transcription analyzer 230 may identify or otherwise determine the potential airspaces, airports, aircraft procedures (or procedure information associated therewith) and/or the like that the ATC clearance communication could reasonably pertain to, and then utilize the procedure database 232 or other data or information sources to determine potential values for the missing operational parameter or variable given the airspace, airport, aircraft procedure or the like that is identified as being relevant to the current aircraft operating state. In this regard, the current aircraft operating state may be utilized to identify potential or plausible values for the missing operational parameter, while also being utilized to filter or otherwise exclude values that relate to airspaces, airports, aircraft procedures and/or the like that are not relevant to the current aircraft operating state.

In one or more exemplary embodiments, in addition to the current aircraft operating state, the transcription analyzer 230 also utilizes the current and/or preceding conversational context using the clearance table 224 to determine potential or plausible values for the missing operational parameter or variable based on one or more preceding audio communications. For example, the transcription analyzer 230 may analyze one or more preceding clearance communications in the clearance table 224 to identify a previously communicated identifier or value for a particular operational parameter or variable. For example, when the operational objective of the clearance exhibiting a discrepancy corresponds to an ATC assignment for a particular operational subject or parameter, the transcription analyzer 230 may analyze one or more preceding clearance communications in the clearance table 224 to identify a preceding ATC assignment issued to another aircraft for that particular operational subject or parameter and identify the value from that preceding ATC assignment as a potential value.

In exemplary embodiments, based on the nature of the potential values identified for the missing operational parameter using the current operational context, the clearance challenging process 300 automatically classifies or otherwise assigns the ATC clearance communication to a particular type or classification from among a number of different potential discrepancy classifications. In this regard, the discrepancy classification is utilized to convey, to the pilot or other user, the general nature of the discrepancy or anomaly exhibited by the respective ATC clearance communication without requiring manual review or assessment of the content of the communication or other real-time operating conditions or statuses. It should be appreciated that the subject matter described herein is not limited to any particular type, number or configuration of classifications to which a clearance communication could be assigned, nor is the subject matter described herein limited to any particular type of technique for automatically determining how to classify or categorize an anomalous ATC clearance communication. In one or more implementations, a clearance communication exhibiting multiple discrepancies could be assigned to more than one classification or category (e.g., incomplete and ambiguous, etc.).

For example, when an ATC clearance communication fails to specify a value for an operational parameter or variable associated with the expected pilot action in response to the ATC clearance communication, and a potential value for that operational parameter cannot be inferred or otherwise identified from the current operational context (e.g., the current aircraft status or the preceding ATC clearance communications), the clearance challenging process 300 may automatically assign the discrepancy associated with ATC clearance communication to an incomplete clearance classification and update the entry associated with the respective clearance communication in the clearance table 224 to include a tag or other metadata field that indicates the incomplete clearance classification assigned to the communication. On the other hand, when multiple different values for a missing operational parameter can be inferred or otherwise identified from the current operational context, the clearance challenging process 300 may automatically assign the ATC clearance communication to an ambiguous clearance classification because the clearance communication is susceptible to multiple different interpretations given the current context. As yet another example, when a potential value for a missing operational parameter can be inferred or otherwise identified from the current operational context that conflicts or is otherwise inconsistent with another aspect of the current operational context (e.g., a potential value identified from preceding ATC clearance communications that conflicts with the current flight plan), the clearance challenging process 300 may automatically assign the ATC clearance communication to an operational conflict clearance classification because adherence to the clearance communication by the ownship aircraft would conflict with the current flight plan, procedure, or other operational context.

Still referring to FIG. 3, the clearance challenging process 300 continues by generating or otherwise providing graphical indication of the assigned discrepancy classification associated with the clearance communication on a conversation log GUI display (task 312). For example, the conversation log display application 240 may automatically render or otherwise generate a graphical representation of the assigned discrepancy type classification on the conversation log GUI display adjacent to or otherwise in visual or graphical association with the graphical representation of the textual content of the transcribed clearance communication exhibiting the discrepancy. Thus, when a pilot or other user utilizes the conversation log GUI display to review the content of the transcribed clearance communication, the indication of the type of discrepancy or anomaly associated with the respective clearance communication is provided in a prominent manner that notifies the pilot of the potential anomalies or discrepancies associated with the clearance communication.

Figure 4:
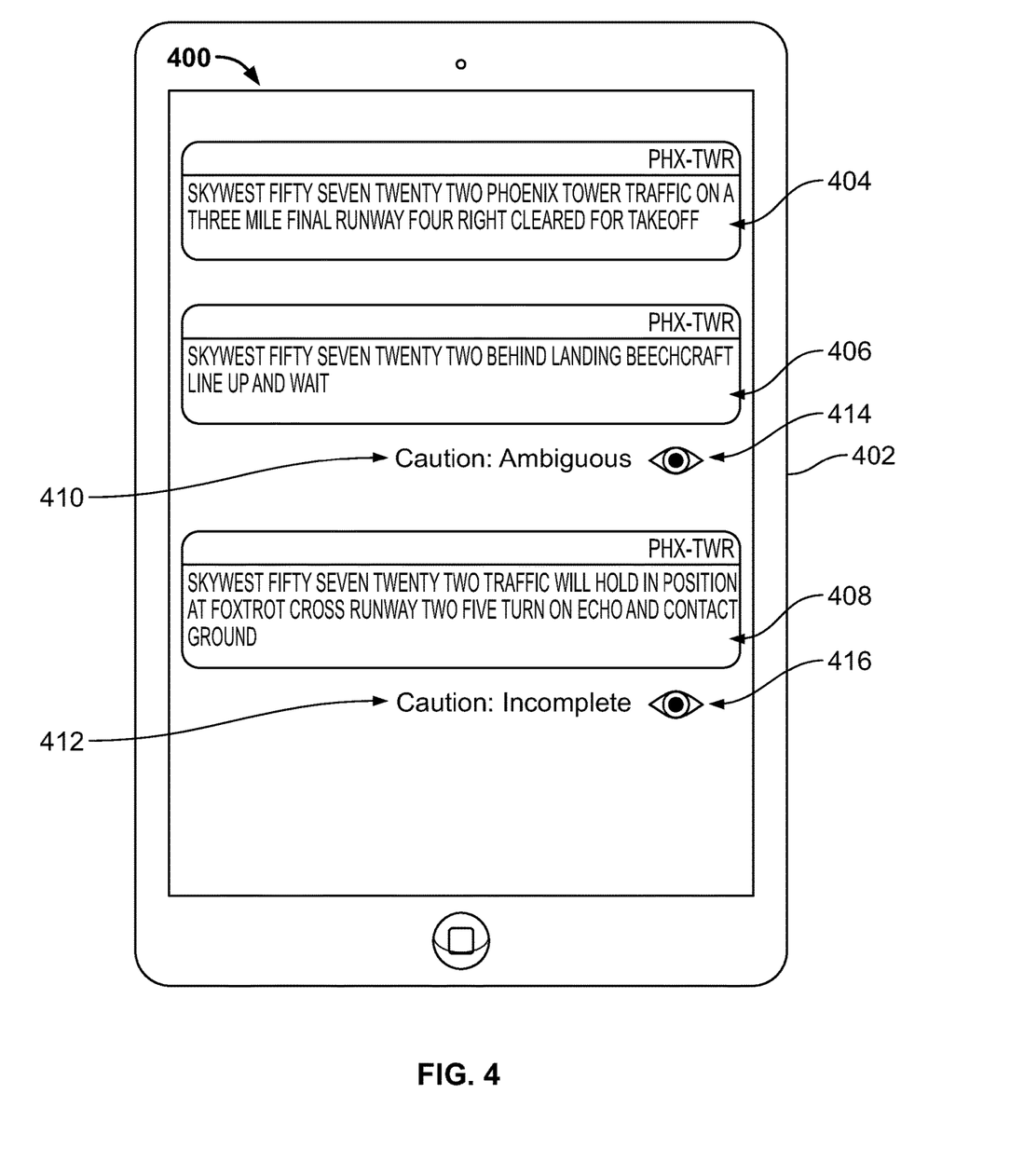
FIGS. 4-5 depict exemplary sequences of a conversation log graphical user interface (GUI) display suitable for presentation on a display device in the system of FIG. 1 or FIG. 2 in connection with the clearance challenging process of FIG. 3 in accordance with one or more exemplary embodiments.

FIG. 4 depicts an exemplary conversation log GUI display 400 that may be depicted on a display associated with an electronic device 402 in connection with the clearance challenging process 300 of FIG. 3. In this regard, the electronic device 402 could be realized as any sort of client electronic device, such as, for example, an EFB, a mobile phone, a smartphone, a tablet computer, a laptop computer, and/or the like. In yet other embodiments, the electronic device 402 could be realized as a multi-function control and display unit (MCDU), a display device 102 incorporated into to a flight deck of an aircraft 120, or another hardware component of an onboard system 108, 110, 112, 114, 116, 208 that is incorporated with the flight deck or cockpit of the aircraft 120.

The conversation log GUI display 400 includes graphical representations of transcribed audio ATC communications 404, 406, 408 presented in a top-down chronological order, such that more recent audio communications are depicted below preceding audio communications, with the newest or most recent audio communication at or near the bottom of the conversation log GUI display 400, and the oldest or least recent audio communication at or near the top of the conversation log GUI display 400. In this regard, as audio communications are received, the conversation log GUI display 400 effectively scrolls downward to maintain the most recent audio communications displayed within the presentation region (or window) of the conversation log GUI display 400 while graphical representations of older audio communications advance upward out of the presentation region. In this regard, the conversation log GUI display 400 may include a slider or similar GUI element adapted to allow the pilot or other user to adjust the positioning of the presentation region to encompass graphical representations of a particular subset of previously received audio communications. The graphical representations 404, 406, 408 of the transcribed audio ATC communications issued by the ATC or other external source may be rendered at or along first side or edge of the conversation log GUI display 400 using one or more visually distinguishable graphical characteristics (e.g., color, font, shading and/or the like) to convey the depicted communications are associated with another source external to the ownship aircraft 120, while graphical representations of any transcribed audio ATC communications issued by the pilot or other user onboard the ownship aircraft 120 may be rendered at or along an opposing side or edge of the conversation log GUI display 400 using one or more different visually distinguishable graphical characteristics to convey the depicted communications are associated with the ownship aircraft 120 as the source of the depicted communications. In this regard, the conversation log GUI display 400 may also include text or other indicia of the source of the depicted communications 404, 406, 408 (e.g., PHX-TWR) along with the timestamps associated with receipt of the respective communications 404, 406, 408.

FIG. 4 depicts a state of the conversation log GUI display 400 after the clearance challenging process 300 has identified discrepancies associated with a first ATC clearance communication 406 that was automatically assigned to an ambiguous clearance classification and a second ATC clearance communication 408 that was automatically assigned to an ambiguous clearance classification. For example, for the first ATC clearance communication 406, in connection with the clearance challenging process 300, the transcription analyzer 230 analyzes the transcribed ATC clearance communication to identify the operational subject of the clearance communication to be air traffic (or another aircraft) and that the intent or operational objective of the clearance communication is for the ownship aircraft to follow the air traffic. Accordingly, the transcription analyzer 230 may identify the expected pilot response as utilizing a display or other onboard system to locate the specified aircraft and maneuver the aircraft to follow the specified aircraft. In response to identifying that a properly specified aircraft identification is missing or otherwise absent from the clearance communication, the transcription analyzer 230 utilizes the partial aircraft identifier and current operational context associated with the ownship aircraft to determine that multiple different potential values for the other aircraft having the same make or manufacturer are possible given the current operational context (e.g., based on preceding ATC communications to, from or referring to multiple different aircraft having the same make or manufacturer, based on radar, transponders, or other air traffic data from a traffic monitoring system identifying multiple different aircraft having the same make or manufacturer in a vicinity of the ownship aircraft, etc.), and that the ATC clearance communication is therefore ambiguous and susceptible to multiple interpretations. In accordance with the clearance challenging process 300, the transcription analyzer 230 updates the entry associated with the depicted clearance communication 406 in the clearance table 224 to include a tag or other metadata identifying the clearance communication as being assigned to the ambiguous clearance classification and provides corresponding indication to the conversation log display application 240, which, in turn, generates or otherwise provides a graphical representation 410 of the assigned ambiguous clearance classification on the conversation log GUI display 400 adjacent to or otherwise in visual association with the graphical representation of the anomalous clearance communication 406.

In a similar manner, for the second ATC clearance communication 408, the transcription analyzer 230 analyzes the transcribed ATC clearance communication to identify one operational subject of the clearance communication to be air traffic (or another aircraft) and that the intent or operational objective of the clearance communication with respect to the aircraft is for the ownship aircraft to locate or identify the air traffic. In response to identifying that a properly specified aircraft identification is missing or otherwise absent from the clearance communication and that the clearance communication lacks a partial aircraft identifier or any other manner for inferring or deriving the requisite aircraft identifier for performing the expected pilot response, the transcription analyzer 230 assigns the clearance communication 408 to the incomplete clearance classification, updates the entry associated with the depicted clearance communication 408 in the clearance table 224 to include a tag or other metadata identifying the clearance communication as being assigned to the ambiguous clearance classification and provides corresponding indication to the conversation log display application 240, which, in turn, generates or otherwise provides a graphical representation 412 of the assigned incomplete clearance classification on the conversation log GUI display 400 adjacent to or otherwise in visual association with the graphical representation of the anomalous clearance communication 408. In some implementations, where the clearance communication includes more than one discrepancy, the transcription analyzer 230 may assign the clearance communication 408 to multiple clearance discrepancy classifications (e.g., incomplete and ambiguous) and update the entry associated with the depicted clearance communication 408 identifying each of the assigned clearance discrepancy classifications. Moreover, the different clearance discrepancy classifications may be assigned different relative priorities or rankings with respect to one another (e.g., operational conflict may be ranked ahead of incomplete, which may be ranked ahead of ambiguous, etc.), such that the transcription analyzer 230 provides indication of the highest priority or highest ranked clearance discrepancy classification (e.g., incomplete) to the conversation log display application 240 to provide a graphical indication 412 of the highest ranked or highest priority clearance discrepancy classification (e.g., incomplete); that said, other implementations may provide graphical indicia of all assigned clearance discrepancy classifications on the conversation log GUI display.

Referring again to FIG. 3, in exemplary implementations, the clearance challenging process 300 attempts to utilize the current operational context to identify or otherwise determine one or more suggestions for resolving the detected discrepancy (task 314). For example, the clearance challenging process 300 may utilize the current aircraft location, the current aircraft altitude, the current aircraft heading, the current procedure being flown, the current flight plan and/or the like to identify or otherwise determine one or more potential values for the operational parameter or variable that was missing from a transcribed clearance communication. Depending on the implementation, the clearance challenging process 300 may utilize rule-based logic, machine learning, AI techniques, relevant aircraft procedure data (e.g., from procedure database 232) or another suitable technique for identifying potential values for an operational parameter consistent with the current operational context. In this regard, potential values identified in connection with classifying the clearance communication as ambiguous, unclear or the like may be similarly utilized as suggested resolutions to facilitate the pilot communicating or negotiating with ATC to arrive at a particular value for the operational parameter that enables the pilot to safely perform the expected pilot response to the clearance communication. For incomplete clearance communications where potential values to resolve a discrepancy are unable to be identified, the clearance challenging process 300 may automatically generate explanatory information that explains or otherwise conveys what operational parameter is missing or otherwise lacks a specified value.

Still referring to FIG. 3, in exemplary implementations, the clearance challenging process 300 generates or otherwise provides a selectable GUI element on the conversation log GUI display for viewing the suggested resolutions or other explanatory information associated with the respective anomalous communication in visual or graphical association with the graphical representation of the respective communication (task 316). In response to selection of the selectable GUI element, the clearance challenging process 300 generates, renders or otherwise provides an advisory GUI display on the display device that includes a graphical representation of the suggested resolutions or other explanatory information for the detected discrepancy associated with the communication (task 318). In exemplary implementations, the conversation log display application 240 generates the advisory GUI display as a window or other inset region within the conversation log GUI display or overlying only a portion of the conversation log GUI display, such that at least some of the graphical representations of the transcribed clearance communications are maintained visible on the adjacent or underlying conversation log GUI display while the advisory GUI display is concurrently presented. That said, in other embodiments, the conversation log display application 240 generates the advisory GUI display as a separate GUI display overlying or in lieu of the conversation log GUI display.

Figure 5:
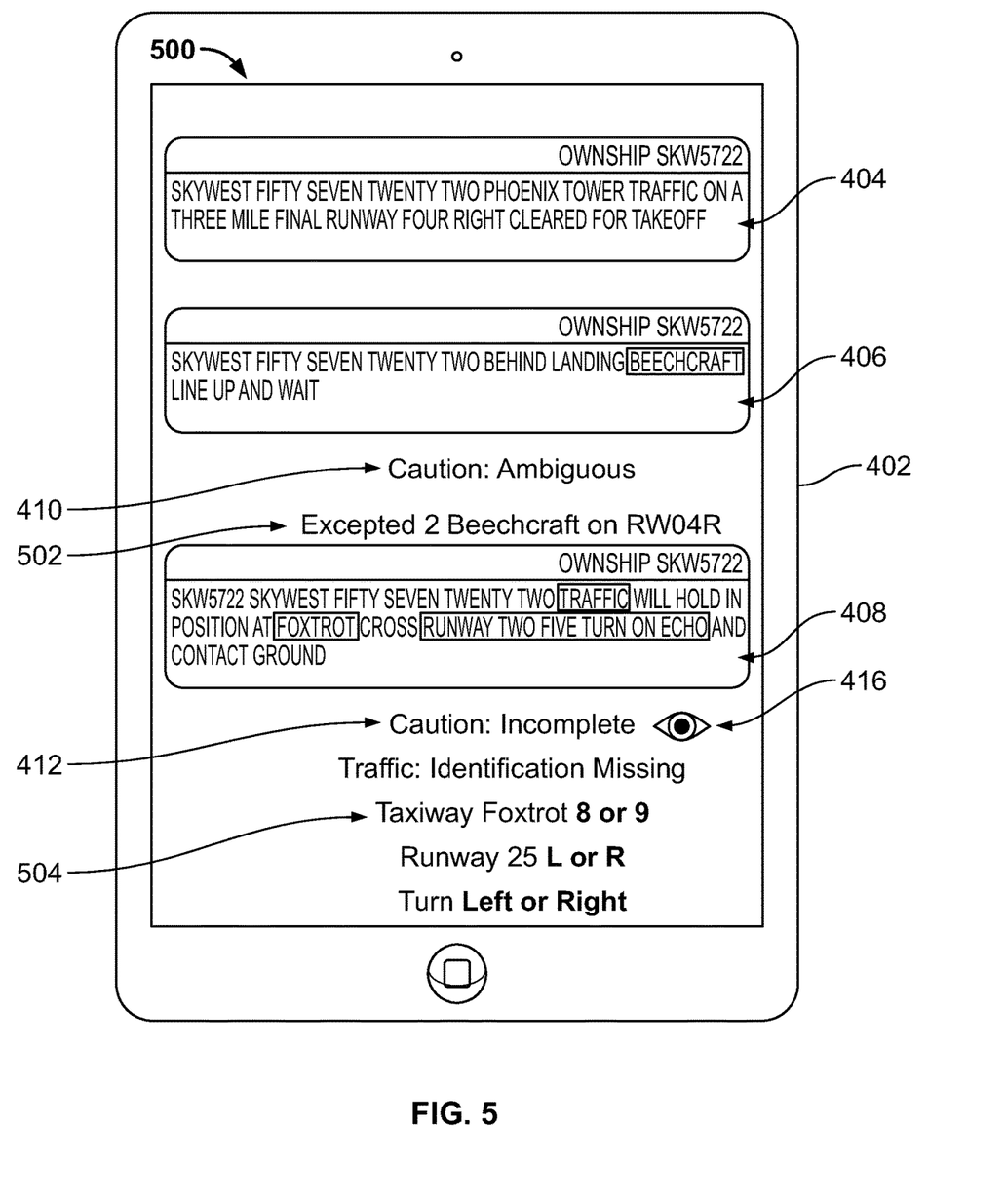

FIG. 5 depicts an updated state of the conversation log GUI display 400 of FIG. 4 in response to selection of the selectable GUI elements 414, 416 associated with the depicted anomalous clearance communications 406, 408. For example, in response to user selection of an expand button 414 to view additional information associated with the transcribed ATC clearance communication 406, the clearance challenging process 300 dynamically updates the display of the electronic device 402 to include an advisory GUI display region below the depicted clearance communication 406 on the conversation log GUI display 400 that includes a graphical representation 502 of the additional information identified to facilitate resolution of the discrepancy associated with the respective clearance communication 406 (e.g., by providing a pilot notification that multiple aircraft of the same make or manufacturer are on the specified runway). Similarly, in response to user selection of an expand button 416 to view additional information associated with the subsequent ATC clearance communication 408, the clearance challenging process 300 dynamically updates the display of the electronic device 402 to include another advisory GUI display region below the depicted clearance communication 408 on the conversation log GUI display 400 that includes a graphical representation 504 of the additional information identified to facilitate resolution of the discrepancies associated with the respective clearance communication 408. For example, in the illustrated example, where the depicted clearance communication 408 includes both incomplete and ambiguous discrepancies, the graphical representation 504 includes indication of what operational parameter is incomplete and missing a specified value (e.g., "Traffic: Identification Missing") along with suggested resolutions for other ambiguous discrepancies where more than one potential value is consistent with the current operational context. For example, based on the current aircraft location on the ground with respect to the different taxiways that are prefaced by the letter "f" (or "foxtrot"), the transcription analyzer 230 may automatically identify the potential taxiways that are ahead of the current aircraft location in the direction of the current aircraft heading (e.g., taxiways F8 or F9) and provide corresponding graphical indication of the potential values for those taxiways as suggested resolutions for the ambiguous taxiway identifier. Similarly, the transcription analyzer 230 may automatically identify different potential runways and potential directions for turning given the current aircraft location and heading and provide graphical indication of the potential values to facilitate the pilot challenging the ATC to resolve the discrepancies associated with the anomalous clearance communication 408.

By consolidating and integrating the presentation of detected discrepancies or anomalies associated with transcribed ATC clearance communications between pilots and ATC with the presentation of transcriptions those ATC clearance communications, a pilot or other user is provided with an intuitive and comprehensive view of communications with respect to an aircraft that allows for quick identification of potentially anomalous ATC clearances and the nature of the discrepancies associated with the depicted ATC clearance communications. The conversation log GUI display also allows the pilot to selectively toggle the conversation log GUI display to review suggested resolutions and additional information relevant to a clearance communication of interest, which reduces pilot workload and head-down time. As a result, a pilot can expeditiously analyze and challenge the particular ATC clearance communication with ATC, thereby improving safety by reducing the likelihood of a pilot relying on anomalous clearance communications.

For the sake of brevity, conventional techniques related to user interfaces, speech recognition, avionics systems, datalink systems, messaging systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
   obtaining a transcription of an audio communication with respect to the vehicle;
   obtaining transcriptions of one or more preceding audio communications with respect to the vehicle;
   generating a conversation log graphical user interface (GUI) display comprising a graphical representation of the transcription of the audio communication;
   analyzing the transcription of the audio communication to detect an ambiguity associated with the audio communication based at least in part on the transcriptions of the one or more preceding audio communications and identify a discrepancy between the transcription of the audio communication and an expected response to the audio communication by an operator of the vehicle;
   generating, on the conversation log GUI display, a selectable GUI element associated with the discrepancy in association with the graphical representation of the transcription of the audio communication; and
   in response to user selection of the selectable GUI element, providing, on the conversation log GUI display, a graphical representation of information relating to the discrepancy.

2. The method of claim 1, further comprising:
classifying the discrepancy as one of a plurality of different classifications, resulting in an assigned classification associated with the audio communication; and
generating, on the conversation log GUI display, a graphical indication of the assigned classification associated with the audio communication.

3. The method of claim 1, further comprising determining an expected parameter for the expected response, wherein:
the discrepancy comprises an absence of a specified value for the expected parameter; and
the graphical representation of information comprises a graphical indication of the expected parameter for the expected response.

4. The method of claim 3, further comprising:
obtaining current status information associated with the vehicle from one or more systems onboard the vehicle; and
determining one or more potential values for the expected parameter based the current status information, wherein the graphical representation of information relating to the discrepancy includes a graphical representation of the one or more potential values.

5. The method of claim 1, further comprising obtaining current status information associated with the vehicle from one or more systems onboard the vehicle, wherein analyzing the transcription of the audio communication to identify the discrepancy comprises detecting the ambiguity associated with the audio communication based at least in part on the current status information.

6. The method of claim 5, further comprising determining a suggested resolution for the discrepancy based on a relationship between the current status information, wherein the graphical representation of information includes a graphical representation of the suggested resolution.

7. The method of claim 1, further comprising determining one or more potential values for resolving the ambiguity based at least in part on the one or more preceding audio communications, wherein the graphical representation of information relating to the discrepancy includes a graphical representation of the one or more potential values.

8. The method of claim 1, wherein:
the audio communication comprises a clearance communication from an air traffic controller (ATC);
the discrepancy comprises an absence of a specified value for an operational parameter associated with the expected response; and
the graphical representation of information comprises a graphical indication of one or more potential values for the operational parameter to challenge the ATC.

9. The method of claim 1, wherein:
the vehicle comprises an aircraft;
the audio communication comprises a clearance communication from an air traffic controller (ATC); and
the graphical representation of information comprises a graphical indication of one or more potential values for an operational parameter associated with the discrepancy to challenge the ATC.

10. A computer-readable medium having computer-executable instructions stored thereon that, when executed by a processing system, cause the processing system to:
obtain a transcription of an audio communication with respect to a vehicle;
obtain transcriptions of one or more preceding audio communications with respect to the vehicle;
generate a conversation log graphical user interface (GUI) display comprising a graphical representation of the transcription of the audio communication;
analyze the transcription of the audio communication to detect an ambiguity associated with the audio communication based at least in part on the transcriptions of the one or more preceding audio communications and identify a discrepancy between the transcription of the audio communication and an expected response to the audio communication by an operator of the vehicle;
generate, on the conversation log GUI display, a selectable GUI element associated with the discrepancy in association with the graphical representation of the transcription of the audio communication; and
in response to user selection of the selectable GUI element, providing, on the conversation log GUI display, a graphical representation of information relating to the discrepancy.

11. The computer-readable medium of claim 10, wherein the computer-executable instructions cause the processing system to:
classify the discrepancy as one of a plurality of different classifications, resulting in an assigned classification associated with the audio communication; and
generate, on the conversation log GUI display, a graphical indication of the assigned classification associated with the audio communication.

12. The computer-readable medium of claim 10, wherein the computer-executable instructions cause the processing system to determine an expected parameter for the expected response, wherein the discrepancy comprises an absence of a specified value for the expected parameter and the graphical representation of information comprises a graphical indication of the expected parameter for the expected response.

13. The computer-readable medium of claim 12, wherein the computer-executable instructions cause the processing system to:
obtain current status information associated with the vehicle from one or more systems onboard the vehicle; and
determine one or more potential values for the expected parameter based the current status information, wherein the graphical representation of information relating to the discrepancy includes a graphical representation of the one or more potential values.

14. The computer-readable medium of claim 10, wherein the computer-executable instructions cause the processing system to obtain current status information associated with the vehicle from one or more systems onboard the vehicle, wherein analyzing the transcription of the audio communication to identify the discrepancy comprises detecting the ambiguity associated with the audio communication based at least in part on the current status information.

15. The computer-readable medium of claim 14, wherein the computer-executable instructions cause the processing system to determine a suggested resolution for the discrepancy based on a relationship between the current status information, wherein the graphical representation of information includes a graphical representation of the suggested resolution.

16. The computer-readable medium of claim 10, wherein the computer-executable instructions cause the processing system to determine one or more potential values for resolving the ambiguity based at least in part on the one or more preceding audio communications, wherein the graphical representation of information relating to the discrepancy includes a graphical representation of the one or more potential values.

17. The computer-readable medium of claim 10, wherein:
the audio communication comprises a clearance communication from an air traffic controller (ATC);
the discrepancy comprises an absence of a specified value for an operational parameter associated with the expected response; and
the graphical representation of information comprises a graphical indication of one or more potential values for the operational parameter to challenge the ATC.

18. A system comprising:
a display device;
a data storage element to maintain a transcription of an audio communication with respect to a vehicle and transcriptions of one or more preceding audio communications with respect to the vehicle; and
a processing system coupled to the display device and the data storage element to:
generate, on the display device, a conversation log graphical user interface (GUI) display comprising a graphical representation of the transcription of the audio communication;
analyze the transcription of the audio communication to detect an ambiguity associated with the audio communication based at least in part on the transcriptions of the one or more preceding audio communications and identify a discrepancy between the transcription of the audio communication and an expected response to the audio communication by an operator of the vehicle;
generate, on the conversation log GUI display, a selectable GUI element associated with the discrepancy in association with the graphical representation of the transcription of the audio communication; and
in response to user selection of the selectable GUI element, provide, on the conversation log GUI display, a graphical representation of information relating to the discrepancy.

19. The system of claim 18, wherein the processing system is configured to:
classify the discrepancy as one of a plurality of different classifications, resulting in an assigned classification associated with the audio communication; and
generate, on the conversation log GUI display, a graphical indication of the assigned classification associated with the audio communication.

20. The system of claim 18, wherein the vehicle comprises an aircraft and the audio communication comprises a clearance communication from an air traffic controller (ATC).

* * * * *